(12) United States Patent
Donohue et al.

(10) Patent No.: US 12,276,590 B2
(45) Date of Patent: Apr. 15, 2025

(54) SURFACE AREA DETERMINATION FOR POROUS AND PARTICULATE MATERIALS

(71) Applicant: The Johns Hopkins University, Baltimore, MD (US)

(72) Inventors: Marc Donohue, Baltimore, MD (US); Gregory Aranovich, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 855 days.

(21) Appl. No.: 17/309,268

(22) PCT Filed: Nov. 12, 2019

(86) PCT No.: PCT/US2019/060850
§ 371 (c)(1),
(2) Date: May 13, 2021

(87) PCT Pub. No.: WO2020/102148
PCT Pub. Date: May 22, 2020

(65) Prior Publication Data
US 2021/0404935 A1    Dec. 30, 2021

Related U.S. Application Data

(60) Provisional application No. 62/767,248, filed on Nov. 14, 2018.

(51) Int. Cl.
*G01N 15/00*    (2024.01)
*G01N 15/08*    (2006.01)

(52) U.S. Cl.
CPC ................. *G01N 15/088* (2013.01)

(58) Field of Classification Search
None
See application file for complete search history.

(56) References Cited

U.S. PATENT DOCUMENTS 4,489,593 A * 12/1984 Pieters .............. G01N 15/0893
73/865.5
5,725,987 A * 3/1998 Combes ............ G03G 9/09716
427/255.31

(Continued)

FOREIGN PATENT DOCUMENTS

CN    107421864 A    12/2017
JP    H0634517 A    2/1994

OTHER PUBLICATIONS

International Search Report and Written Opinion for Application No. PCT/US2019/060850, mailed on Mar. 19, 2020, 6 pages.

*Primary Examiner* — Erica S Lin
(74) *Attorney, Agent, or Firm* — Harrity & Harrity, LLP

(57) ABSTRACT

In some aspects, a device may receive measurement data associated with a measurement subject. The device may determine an adsorption isotherm for the measurement subject based on the measurement data. The device may determine a thermodynamic adsorption capacity of the measurement subject based on the adsorption isotherm. The device may determine a surface area value associated with the measurement subject based on the thermodynamic adsorption capacity. The device may provide an output based on the adsorption capacity or the surface area value associated with the measurement subject.

20 Claims, 5 Drawing Sheets

(56) References Cited

U.S. PATENT DOCUMENTS

2004/0206161 A1 10/2004 Gupta et al.
2011/0315629 A1* 12/2011 Drogui .................. C02F 3/1273
                                                                                210/616

* cited by examiner

SURFACE AREA DETERMINATION FOR POROUS AND PARTICULATE MATERIALS

RELATED APPLICATION(S)

This application is a 371 national stage of PCT Application PCT/US2019/060850 filed on Nov. 12, 2019, which claims priority to U.S. Provisional Patent Application No. 62/767,248, filed on Nov. 14, 2018, both of which are hereby expressly incorporated by reference herein.

GOVERNMENT LICENSE RIGHTS

This invention was made with U.S. Government support under grant DE-AR-0000708, awarded by the Advanced Research Projects Agency-Energy (ARPA-E). The U.S. Government has certain rights in the invention.

BACKGROUND

The specific surface area of a material is its surface area per unit mass. The specific surface area is important in characterizing the size of small particles and also is important in characterizing the porosity of porous materials. The specific surface area is used in many scientific and commercial fields including chemistry, chemical engineering, environmental science and engineering, physics, materials science, and/or the like to help understand and/or control the properties of materials. Measurements of specific surface areas are used in a variety of industries for quality control in the manufacture of particulate and porous materials. For example, a calculation of a specific surface area may be used in the characterization of materials used as catalysts of chemical reactions.

The specific surface area may be determined based on experimental measurements of an adsorption isotherm and using the Brunauer-Emmett-Teller (BET) equation. In this technique, a device, which may be referred to as a sorptometer, is used to measure the amount of an inert gas (i.e., an adsorbate) that is absorbed on a surface of a material of interest (the adsorbent) at a particular temperature (e.g., the boiling temperature of the inert gas) as a function of the pressure. In one type of sorptometer, the sorptometer measures the volume of the inert gas (e.g., nitrogen) adsorbed on the surface of the material of interest. This adsorption determination may be termed a geometric adsorption capacity or a geometric surface area.

Based on the geometric adsorption capacity, the specific surface area of the material of interest may be derived. If the specific surface area can be determined with a sufficient level of accuracy, this information can enable design and/or control of chemical processes using this information. For example, accurate values of a specific surface area for adsorbing materials can enable the design and operation of separation processes used to purify chemicals, foods (e.g., sugar), pharmaceuticals, and/or the like. In addition, accurate information about a specific surface area of a catalyst can enable selection of one type of material over a second type of material to act as a catalyst or to control a catalytic chemical reaction. The specific surface area may be calculated with a threshold level of accuracy for a disperse material, a nonporous material, a macroporous material (e.g., materials associated with a pore size of greater than approximately 50 nanometers), and/or the like using the BET equation.

DETAILED DESCRIPTION

Figure 1A:
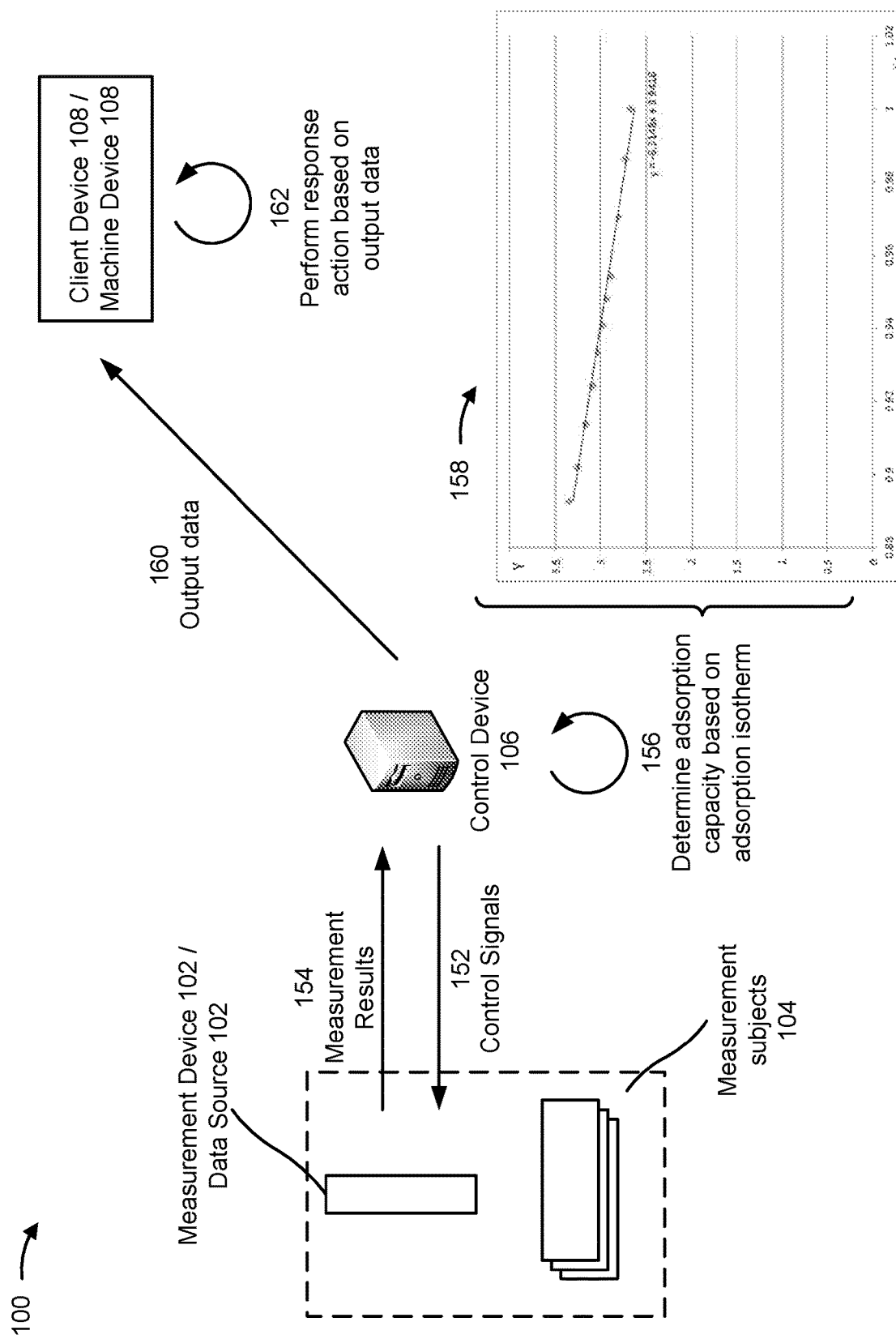
FIGS. 1A and 1B are diagrams of an example implementation described herein.

The following detailed description of example implementations refers to the accompanying drawings. The same reference numbers in different drawings may identify the same or similar elements.

As described above, techniques based on the BET equation achieve a threshold level of accuracy for a surface area determination for some materials by basing the surface area determination on a determination of a geometric adsorption capacity. However, BET-based methods do not achieve a threshold level of accuracy for mesoporous materials (e.g., materials with pore sizes of less than approximately 50 nanometers (nm)), microporous materials (e.g., materials with pore sizes of less than approximately 2 nm), nano-sized particulate materials, and/or the like. In these cases, condensation of an adsorbate in pores or interstitial spaces of a material of interest may result in the geometric adsorption capacity differing from the actual adsorption capacity by greater than a threshold amount. Moreover, inactive pores of the material of interest may cause the geometric adsorption capacity and geometric surface area to differ from the actual adsorption capacity and actual surface area by greater than the threshold amount. As a result, a determination of a specific surface area of a material of interest based on the geometric adsorption capacity may fail to achieve a threshold level of accuracy necessary for control of a chemical reaction, accurate selection of a catalyst for a chemical reaction, control of an adsorption-based separation, accurate selection of an adsorbate, and/or the like.

Some implementations described herein provide an improved method for determining a specific surface area of a material of interest, thereby enabling improved control of separation processes and chemical reactions relative to determinations based on a geometric adsorption capacity. In this case, a device may use data from a different part of an adsorption isotherm than is used in the BET method and may use a different data analysis technique to determine the specific surface area. In particular, the device may determine a change in sign of a particular thermodynamic characteristic of the adsorbate to determine a specific surface area. In this way, the device may calculate a thermodynamic surface area rather than the geometric surface area.

For example, a sorptometer may be used to determine the adsorption isotherm of an inert adsorbate on a material of interest (e.g., mesoporous materials, microporous materials, particulate materials, and/or the like). However, the portion of the adsorption isotherm used in the present invention is different from that used in the BET method and rather than using the data to determine the geometric adsorption capacity, the data is used to determine the thermodynamic adsorption capacity of the microporous material. Based on determining the thermodynamic adsorption capacity, the device may determine a thermodynamic specific surface area, and may use the determination of the specific surface area to cause a response action, such as selecting a material for use as a catalyst, selecting an adsorbent material from a group of available adsorbents for an adsorption separation process, controlling a machine to cause a desired result to a chemical reaction, and/or the like. In this way, the device may more accurately control the machine, select a catalyst, and/or the like than is possible using a BET-based method to perform a surface area determination.

Figure 1B:
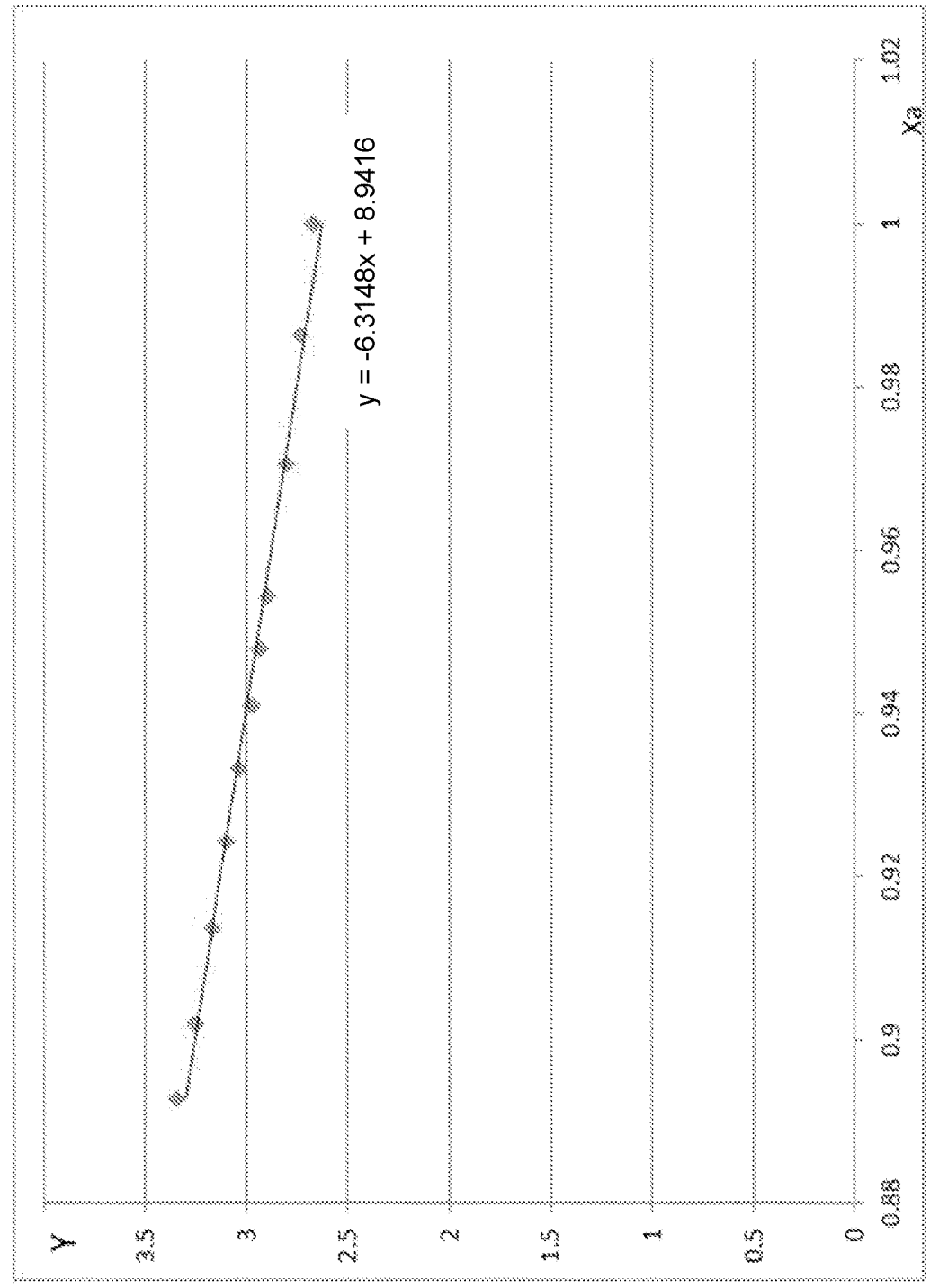

FIGS. 1A and 1B are diagrams of an example implementation 100 described herein. As shown in FIG. 1A, example implementation 100 may include a measurement device 102, a set of measurement subjects 104, a control device 106, and a client device 108. In some implementations, measurement device 102 may be a data source 102, as described in more detail herein. In some implementations, client device 108 may be a machine device 108, as described in more detail herein. In some implementations, data source 102 may be separate from measurement device 102 and/or machine device 108 may be separate from client device 108.

As further shown in FIG. 1A, and by reference number 152, control device 106 may provide a set of control signals to measurement device 102. For example, control device 106 may cause measurement device 102 to perform a set of measurements of measurement subjects 104, which may be materials of interest (or multiple samples of a single material of interest) for determining a surface area. Additionally, or alternatively, control device 106 may cause data source 102 to provide stored information identifying the set of measurements. For example, when a set of measurements are performed and stored for subsequent use, control device 106 may communicate with data source 102 to obtain the set of measurements at a subsequent time.

In some implementations, measurement device 102 may perform a measurement of an adsorption of a material of interest that is included in measurement subjects 104. For example, based on receiving the set of control signals from control device 106, measurement device 102 may measure an adsorption isotherm for the material of interest by determining a set of measurements of adsorption relative to pressure at a constant temperature. In some implementations, measurement device 102 may obtain the set of measurements at a set of configured measurement conditions. For example, measurement device 102 may cause a set of measurements to be performed at pressures less than $0.05 \times p_s$, where $p_s$ is a saturation pressure of a measurement subject. In this way, measurement device 102 may enable a surface area measurement based on the phenomena of adsorption compression, which may occur at such pressures, and may not occur at higher pressures used for BET-theory based techniques. Similarly, measurement device 102 may cause a set of measurements to be performed at pressures less than $0.1 \times p_s$, where $p_s$ represents the saturation pressure of a measurement subject. As shown by reference number 154, control device 106 may receive measurement results identifying the set of measurements of adsorption relative to pressure at the constant temperature.

As further shown in FIG. 1A, and by reference number 156, control device 106 may determine an adsorption capacity based on an adsorption isotherm. For example, control device 106 may determine a thermodynamic equilibrium for adsorptive molecules based on an equation, such as:

$$\ln\frac{x_1(1-x_b)}{(1-x_1)x_b} = -\frac{\varepsilon_s}{kT} - x_1\Gamma(x_1) \tag{1}$$

where $x_1$ and $x_b$ represent average normalized densities in adsorbed phase and in the bulk, respectively, $\varepsilon_s$ is an energy of molecule-surface interaction, k is Boltzmann's constant, T is absolute (Kelvin) temperature, and $\Gamma(x_1)$ is an energy of molecule-molecule interactions as a function of density of the adsorbed phase.

In this case, normalized densities in the adsorbed phase, $x_1$, and in the bulk, $x_b$, are relatively small, such that:

$$x_1 \ll 1 \tag{2}$$

$$x_b \ll 1 \tag{3}$$

which results in equation (1) being transformed to:

$$\ln\frac{x_1}{x_b} = -\frac{\varepsilon_s}{kT} - x_1\Gamma_A \tag{4}$$

where $\Gamma_A$ is $\Gamma(x_1)$ at small values of $x_1$.

Therefore, equation (4) can be represented in the following form:

$$\ln\frac{a/a_m}{x_b} = -\frac{\varepsilon_s}{kT} - (a/a_m)\Gamma_A \tag{5}$$

where a is the density of adsorbed phase and $a_m$ is the adsorbtion capacity.

Further, since the thermodynamic adsorption capacity is adsorption at the point where attraction to an adsorbent material is compensated by repulsions from neighboring molecules of adsorbate, an enthalpic part of equation (5) equals 0, which results in:

$$\frac{\varepsilon_s}{kT} + x_1^* \frac{E_{rep}}{kT} = 0 \tag{6}$$

where $E_{rep}=\Gamma_A kT$ represents the energy of repulsion, and $x_1^*$ is $x_1$ at $a=a_m$ (i.e., $x_1^*=1$), which results in:

$$\frac{\varepsilon_s}{kT} + \frac{E_{rep}}{kT} = 0 \tag{7}$$

Applying $$\Gamma_A = \frac{E_{rep}}{kT}$$

in equation (5) and based on equation (7), the thermodynamic equilibrium of equation (1) takes the form:

$$\ln\frac{a}{x_b} = \ln(a_m) + \frac{E_{rep}}{kT} - \frac{E_{rep}}{a_m kT}a \tag{8}$$

As a result, control device 106 may plot $\ln(a/x_b)$ versus a to obtain a slope, S, and an intercept, I, which are:

$$S = -\frac{E_{rep}}{a_m kT} \tag{9}$$

$$I = \ln(a_m) + \frac{E_{rep}}{kT} \tag{10}$$

Thus, based on the results of the measurements providing experimental data for S and I, control device 106 may determine a result of equations (9) and (10) with respect to $$\frac{E_{rep}}{kT}$$

and $a_m$.

As a result, control device 106 may determine an energy of adsorbate-adsorbate intermolecular interactions without determining adsorption capacity. Further, control device 106 may determine the thermodynamic adsorption capacity, $a_m$. By excluding $$\frac{E_{rep}}{kT}$$

from equations (9) and (10), control device 106 may determine $a_m$ as:

$$\ln(a_m) - Sa_m - I = 0 \quad (11)$$

In this case, an area occupied by one molecule of adsorptive may be defined as $\sigma_s$ and the adsorption capacity may be represented in units of surface area, $S_a$, as:

$$S_a = \sigma_s a_m \quad (12)$$

In this way, control device 106 may implement measurement of $a_m$ at the point where attraction to the surface is balanced by repulsions between adsorbate molecules, thereby enabling the thermodynamic adsorption capacity determination for macroporous materials, mesoporous materials, microporous materials, particulate materials, and/or the like.

Although some implementations described herein are described in terms of mathematical calculations, graph plotting, and/or the like, other determination techniques may be possible, such as use of look-up tables, use of other mathematical relationships, and/or the like.

As further shown in FIG. 1A, and by chart 158 as an example, and as shown in more detail in FIG. 1B, control device 106 may determine the adsorption isotherm for nitrogen ($N_2$) adsorbed by microporous subject material zeolite ZSM-5, which is plotted with regard to $\ln(a/x_b)$ as a function of a. In this case, control device 106 may determine a slope value, S=−6.3148, and an intercept, I=8.9416, which results, using equation (11), in the thermodynamic adsorption capacity, $a_m$=1.36652 micromoles per gram (μmol/g). Based on $a_m$, control device 106 may determine a surface area for zeolite ZSM-5 as 5.9 square meters per gram (m²/g). In contrast, using a BET-theory based technique, control device 106 would determine the surface area to be 434 m²/g, a difference of 7355.9%, which would result in inaccurate machine control based on BET-method calculations.

As further shown in FIG. 1A, and by reference numbers 160 and 162, control device 106 may provide output data to cause client device 108 to perform a response action. For example, control device 106 may cause client device 108 to provide a measurement of a surface area for display. Additionally, or alternatively, control device 106 may provide information identifying a thermodynamic adsorption capacity from which the surface area is derivable. Additionally, or alternatively, control device 106 may provide information identifying an optimal rate of reaction based on the surface area. Additionally, or alternatively, control device 106 may cause additional catalyst to be automatically added to a reaction (e.g., control device 106 may control a catalyst dispenser device to cause the catalyst dispenser device to add additional catalyst to a reaction. Additionally, or alternatively, control device 106 may measure a rate of reaction based on the surface area, and may control steps of a process based on measuring the rate of reaction. Additionally, or alternatively, control device 106 may cause client device 108 to indicate a catalyst selected for a particular chemical reaction such that the surface area of the catalyst causes the chemical reaction to occur at a desired rate, a predicted rate, and/or the like. Additionally, or alternatively, control device 106 may cause machine device 108 to alter a parameter. For example, control device 106 may cause machine device 108 to add a particular amount of a material of interest as a catalyst, change which catalyst is used, stop or start a process step based on a predicted state of a chemical reaction based on a surface area of a catalyst, and/or the like. As an example, machine device 108 may determine when to stop a step of a chemical reaction process. Based on a more accurate determination of a surface area of the catalyst, machine device 108 may more accurately predict when to stop the step of the chemical reaction process, thereby improving results of the chemical reaction process.

In this way, control device 106 enables thermodynamic adsorption capacity determination, thereby improving an accuracy of a surface area determination for a material of interest and thereby improving process control for processes that are dependent on the surface area of the material of interest.

As indicated above, FIGS. 1A and 1B are provided merely as examples. Other examples may differ from what was described with regard to FIGS. 1A and 1B.

Figure 2:
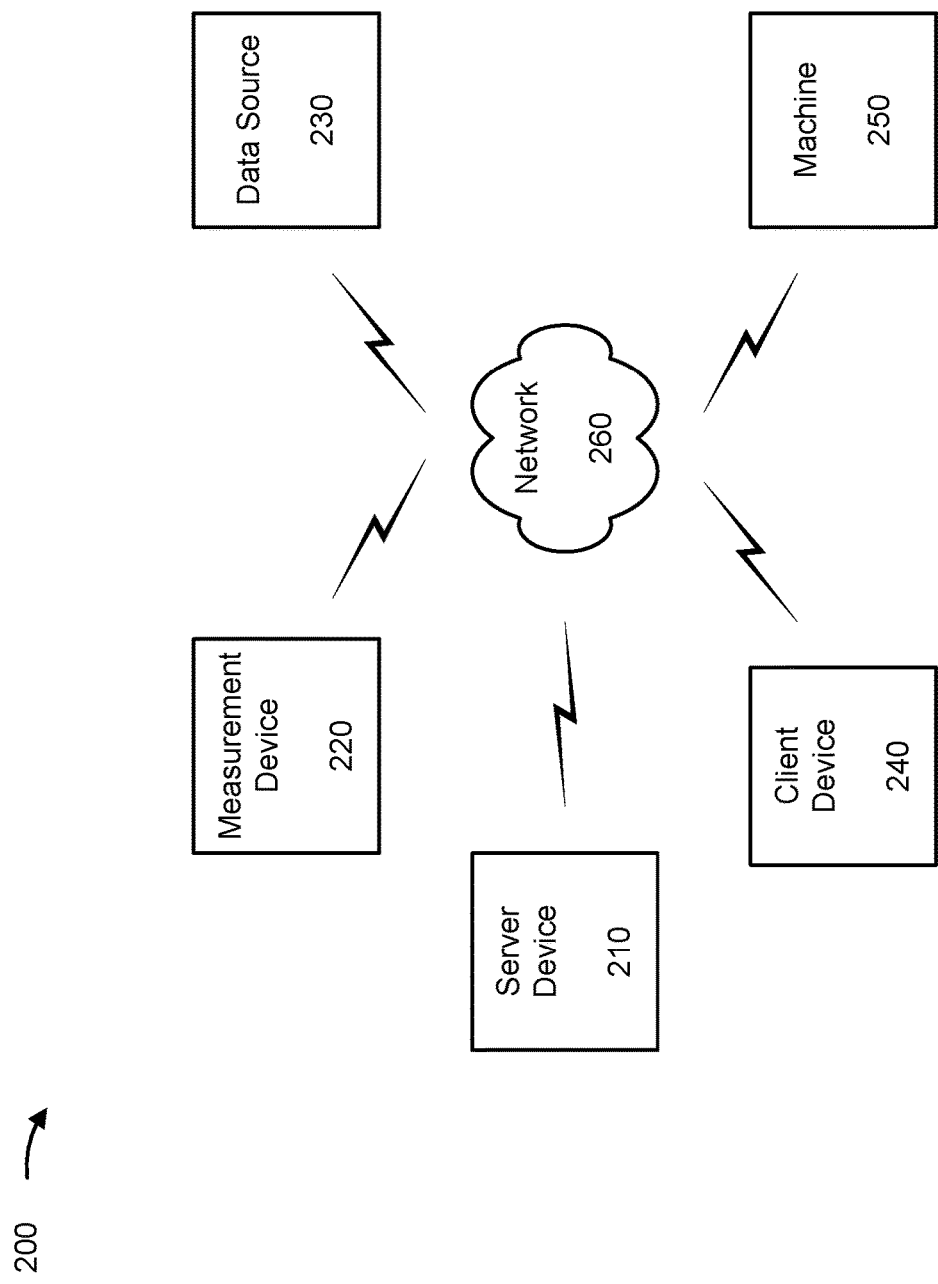
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include server device 210, measurement device 220, data source 230, client device 240, machine 250, network 260, and/or the like. Devices of environment 200 may interconnect via wired connections, wireless connections, or a combination of wired and wireless connections.

Server device 210 includes one or more devices capable of storing, processing, and/or routing information associated with determining a surface area of a subject material based on an adsorption capacity of the subject material. In some implementations, server device 210 may include a communication interface that allows server device 210 to receive information from and/or transmit information to other devices in environment 200.

Measurement device 220 includes one or more devices capable of performing a measurement. For example, measurement device 220 may include an adsorption sensor, a pressure sensor, a temperature sensor, and/or the like. Additionally, or alternatively, measurement device 220 may include one or more devices capable of setting conditions for a measurement. For example, measurement device 220 may include a temperature control device, a pressure control device, a material discharge device (e.g., to expose a first material to a second material), and/or the like. In some implementations, measurement device 220 may include a communication interface that allows measurement device 220 to receive information from and/or transmit information to other devices in environment 200.

Data source 230 includes one or more devices capable of receiving, generating, storing, processing, and/or providing information associated with a measurement. For example, data source 230 may include a data repository storing measurement data relating to one or more subject materials for use in determining a surface area of a material of interest. In some implementations, data source 230 may include a communication interface that allows data source 230 to receive information from and/or transmit information to other devices in environment 200.

Client device 240 includes one or more devices capable of receiving, generating, storing, processing, and/or providing information, such as information described herein. For example, client device 240 may include a computer (e.g., a desktop computer, a laptop computer, a tablet computer, a handheld computer), mobile phone (e.g., a smart phone), a wearable communication device (e.g., a smart wristwatch, a pair of smart eyeglasses, etc.), and/or a similar type of device. In some implementations, client device 240 may include a display device to display a result of determining a surface area of a subject material, to provide a user interface to enable client device 240 to receive input via a user interface, and/or the like. In some implementations, client device 240 may include a communication interface that allows client device 240 to receive information from and/or transmit information to other devices in environment 200.

Machine 250 includes one or more devices capable of receiving, generating, storing, processing, and/or providing information associated with controlling a process. For example, machine 250 may include a machine to control a chemical reaction process that includes a subject material. In this case, the chemical reaction may be dependent and controllable based on a surface area of the subject material, and machine 250 may alter one or more steps of the chemical reaction process (e.g., stop a step, start a step, change a parameter for a step, and/or the like) based on a determination of the surface area of the subject material and/or based on one or more determinations associated therewith. In some implementations, machine 250 may include a communication interface that allows machine 250 to receive information from and/or transmit information to other devices in environment 200.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
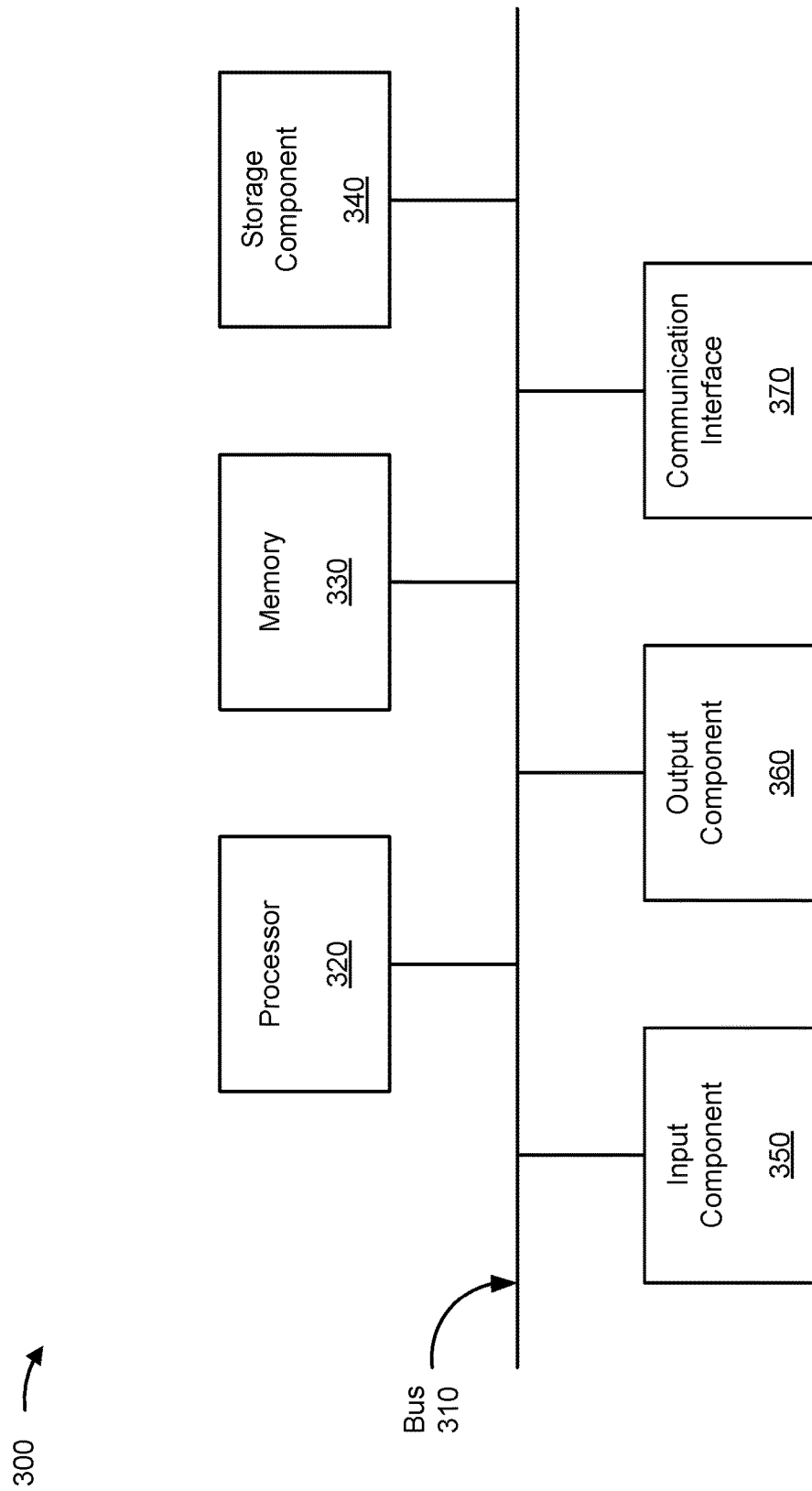
FIG. 3 is a diagram of example components of one or more devices of FIG. 2.

FIG. 3 is a diagram of example components of a device 300. Device 300 may correspond to or include server device 210, measurement device 220, data source 230, client device 240, and/or machine 250. In some implementations, server device 210, measurement device 220, data source 230, client device 240, and/or machine 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
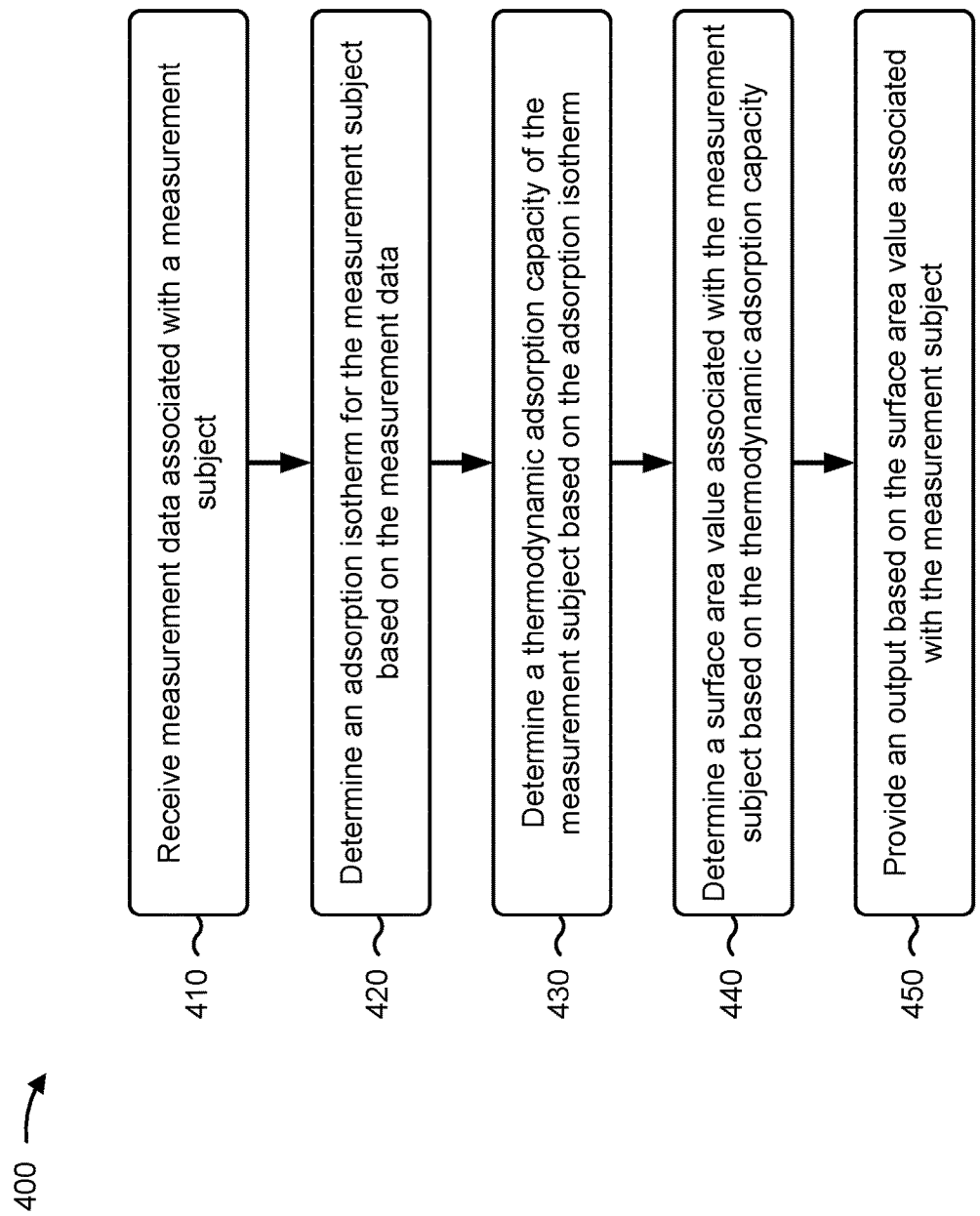
FIG. 4 is a flow chart of an example process for surface area determination for porous and particulate materials.

FIG. 4 is a flow chart of an example process 400 for surface area determination for porous and particular materials. In some implementations, one or more process blocks of FIG. 4 may be performed by a server device (e.g., server device 210). In some implementations, one or more process blocks of FIG. 4 may be performed by another device or a group of devices separate from or including a server device (e.g., server device 210), such as a measurement device (e.g., measurement device 220), a data source (e.g., data source 230) client device (e.g., client device 240), and a machine (e.g., machine 250).

As shown in FIG. 4, process 400 may include receiving measurement data associated with a measurement subject (block 410). For example, the measurement device (e.g., using bus 310, processor 320, memory 330, storage component 340, input component 350, output component 360, communication interface 370, and/or the like) may receive the measurement data associated with the measurement subject, as described in more detail above.

As further shown in FIG. 4, process 400 may include determining an adsorption isotherm for the measurement subject based on the measurement data (block 420). For example, the measurement device (e.g., using bus 310, processor 320, memory 330, storage component 340, input component 350, output component 360, communication interface 370, and/or the like) may determine the adsorption isotherm for the measurement subject based on the measurement data, as described in more detail above.

As further shown in FIG. 4, process 400 may include determining a thermodynamic adsorption capacity of the measurement subject based on the adsorption isotherm (block 430). For example, the measurement device (e.g., using bus 310, processor 320, memory 330, storage component 340, input component 350, output component 360, communication interface 370, and/or the like) may determine the thermodynamic adsorption capacity of the measurement subject based on the adsorption isotherm, as described in more detail above.

As further shown in FIG. 4, process 400 may include determining a surface area value associated with the measurement subject based on the thermodynamic adsorption capacity (block 440). For example, the measurement device (e.g., using bus 310, processor 320, memory 330, storage component 340, input component 350, output component 360, communication interface 370, and/or the like) may determine the surface area value associated with the measurement subject based on the thermodynamic adsorption capacity, as described in more detail above.

As further shown in FIG. 4, process 400 may include providing an output based on the surface area value associated with the measurement subject (block 450). For example, the measurement device (e.g., using bus 310, processor 320, memory 330, storage component 340, input component 350, output component 360, communication interface 370, and/or the like) may provide the output based on the surface area value associated with the measurement subject, as described in more detail above. Additionally, or alternatively, the measurement device may provide an output based on the thermodynamic adsorption capacity.

Process 400 may include additional implementations, such as any single implementation or any combination of implementations described below and/or in connection with one or more other processes described elsewhere herein.

In some implementations, the measurement device may determine a control signal for a machine associated with the measurement subject based on the surface area value, and may provide the control signal, as the output, to control the machine. In some implementations, the output relates to a selection of the measurement subject as a catalyst from a plurality of available catalysts. In some implementations, the output relates to controlling a chemical reaction that includes the measurement subject. In some implementations, the adsorption isotherm is determined for one or more pressures, p, such that p<0.05 ps, wherein ps is a saturation vapor pressure of the measurement subject. In some implementations, the adsorption isotherm is determined for one or more pressures, p, such that p<0.1 pc, wherein pc is a critical pressure of the measurement subject.

In some implementations, the measurement device may determine a result of a first equation $\ln(a_m) - Sa_m - I = 0$, wherein $a_m$ represents the thermodynamic adsorption capacity, S represents a slope of a second equation, and I represents an intercept of the second equation, and wherein the second equation is $\ln(a/x_b) = a$, and wherein a represents an adsorbed amount of the measurement subject and $x_b$ represents a ratio of a gas density of the measurement subject to a liquid density of the measurement subject. In some implementations, the measurement subject is a porous material or a particular material. In some implementations, the measurement subject is a microporous adsorbent. In some implementations, the measurement data is derived from a supercritical adsorption condition. In some implementations, the measurement data is derived from a balance of surface attraction to repulsion.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software codeit being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, measurement data associated with a measurement subject;
   determining, by the device, an adsorption isotherm for the measurement subject based on the measurement data;
   determining, by the device, a thermodynamic adsorption capacity of the measurement subject based on the adsorption isotherm, wherein the thermodynamic adsorption capacity is different from a geometric adsorption capacity;
   determining, by the device, a thermodynamic surface area value associated with the measurement subject based on the thermodynamic adsorption capacity; and
   providing, by the device, an output based on the thermodynamic surface area value associated with the measurement subject.

2. The method of claim 1, further comprising:
   determining a control signal for a machine associated with the measurement subject based on the thermodynamic surface area value; and
   wherein providing the output comprises:
      providing the control signal, as the output, to control the machine.

3. The method of claim 1, wherein the output relates to a selection of the measurement subject as a catalyst from a plurality of available catalysts.

4. The method of claim 1, wherein the output relates to a selection of the measurement subject as an adsorbent material from a plurality of available adsorbents for an adsorption separation process.

5. The method of claim 1, wherein the adsorption isotherm is determined for one or more pressures, p, such that:
   $p<0.05$ ps, wherein ps is a saturation vapor pressure of the measurement subject.

6. The method of claim 1, wherein the adsorption isotherm is determined for one or more pressures, p, such that:
   $p<0.1$ pc, wherein pc is a critical pressure of the measurement subject.

7. The method of claim 1, wherein determining the thermodynamic adsorption capacity comprises:
   determining a result of a first equation:

$$\ln(a_m) - Sa_m - I = 0,$$

wherein $a_m$ represents the thermodynamic adsorption capacity, S represents a slope of a second equation, and I represents an intercept of the second equation, and wherein the second equation is:

$$\ln(a/x_b) = a,$$

wherein a represents an adsorbed amount of the measurement subject and $x_b$ represents a ratio of a gas density of the measurement subject to a liquid density of the measurement subject.

8. A device, comprising:
   one or more memories; and
   one or more processors communicatively coupled to the one or more memories, configured to:
      receive measurement data associated with a measurement subject;
      determine an adsorption isotherm for the measurement subject based on the measurement data;
      determine a thermodynamic adsorption capacity of the measurement subject based on the adsorption isotherm, wherein the thermodynamic adsorption capacity is different from a geometric adsorption capacity; and
      provide an output based on thermodynamic adsorption capacity of the measurement subject.

9. The device of claim 8, wherein the adsorption isotherm is determined for one or more pressures, p, such that:
   $p<0.1$ pc, wherein pc is a critical pressure of the measurement subject.

10. The device of claim 8, wherein the one or more processors, when determining the thermodynamic adsorption capacity, are configured to:
    determine a result of a first equation:

$$\ln(a_m) - Sa_m - I = 0,$$

wherein $a_m$ represents the thermodynamic adsorption capacity, S represents a slope of a second equation, and/represents an intercept of the second equation, and wherein the second equation is:

$$\ln(a/x_b) = a,$$

wherein a represents an adsorbed amount of the measurement subject and $x_b$ represents a ratio of a gas density of the measurement subject to a liquid density of the measurement subject.

11. The device of claim 8, wherein the measurement subject is a porous material or a particular material.

12. The device of claim 8, wherein the measurement subject is a microporous adsorbent.

13. The device of claim 8, wherein the measurement data is derived from a supercritical adsorption condition.

14. The device of claim 8, wherein the measurement data is derived from a balance of surface attraction to repulsion.

15. A non-transitory computer-readable medium storing instructions, the instructions comprising:
   one or more instructions that, when executed by one or more processors, cause the one or more processors to:

receive measurement data associated with a measurement subject;
determine an adsorption isotherm for the measurement subject based on the measurement data;
determine a thermodynamic adsorption capacity of the measurement subject based on the adsorption isotherm, wherein the thermodynamic adsorption capacity is different from a geometric adsorption capacity; and
provide an output based on the thermodynamic adsorption capacity of the measurement subject or a thermodynamic surface area value for the measurement subject that is derived from the thermodynamic adsorption capacity of the measurement subject.

16. The non-transitory computer-readable medium of claim 15, wherein the one or more instructions, when executed by the one or more processors, further cause the one or more processors to:
determine a control signal for a machine associated with the measurement subject based on the thermodynamic adsorption capacity or the thermodynamic surface area value; and
wherein the one or more instructions, that cause the one or more processors to provide the output, cause the one or more processors to:
provide the control signal, as the output, to control the machine.

17. The non-transitory computer-readable medium of claim 15, wherein the output relates to a selection of the measurement subject as a catalyst from a plurality of available catalysts.

18. The non-transitory computer-readable medium of claim 15, wherein the output relates to a selection of the measurement subject as an adsorbent material from a plurality of available adsorbents for an adsorption separation process.

19. The non-transitory computer-readable medium of claim 15, wherein the measurement subject is a microporous adsorbent.

20. The non-transitory computer-readable medium of claim 15, wherein the measurement data is derived from a supercritical adsorption condition.

* * * * *